United States Patent
Hove

(10) Patent No.: US 12,123,410 B2
(45) Date of Patent: Oct. 22, 2024

(54) DOUBLE PUMP

(71) Applicant: Danhydra A/S, Herning (DK)

(72) Inventor: Thomas Hove, Herning (DK)

(73) Assignee: DANHYDRA A/S, Herning (DK)

( * ) Notice: Subject to any disclaimer, the term of this patent is extended or adjusted under 35 U.S.C. 154(b) by 0 days.

(21) Appl. No.: 17/777,147

(22) PCT Filed: Nov. 27, 2020

(86) PCT No.: PCT/EP2020/083632
§ 371 (c)(1),
(2) Date: May 16, 2022

(87) PCT Pub. No.: WO2021/105362
PCT Pub. Date: Jun. 3, 2021

(65) Prior Publication Data
US 2022/0403842 A1 Dec. 22, 2022

(30) Foreign Application Priority Data
Nov. 29, 2019 (DK) .............. PA 2019 01400

(51) Int. Cl.
*F04C 11/00* (2006.01)
*F04C 2/10* (2006.01)
(Continued)

(52) U.S. Cl.
CPC .............. *F04C 11/001* (2013.01); *F04C 2/10* (2013.01); *F04C 13/002* (2013.01); *F04C 14/26* (2013.01); *F04C 23/001* (2013.01)

(58) Field of Classification Search
CPC .... F04C 2/08; F04C 2/084; F04C 2/10; F04C 2/102; F04C 2/14; F04C 2/18;
(Continued)

(56) References Cited

U.S. PATENT DOCUMENTS 1,531,607 A * 3/1925 Green .................. F04C 23/001
                                              418/9
1,930,294 A * 10/1933 Valentine ............... F16N 13/20
                                              222/263
(Continued)

FOREIGN PATENT DOCUMENTS

EP      0 582 185 A1   2/1994
GB      2 013 512 A    8/1979
(Continued)

OTHER PUBLICATIONS

JP2014169672 (A)—Kumamoto et al.—Oil Pump—Sep. 18, 2014—English Machine Translation. (Year: 2014).*
(Continued)

*Primary Examiner* — Theresa Trieu
(74) *Attorney, Agent, or Firm* — Ware, Fressola, Maguire & Barber LLP

(57) ABSTRACT

Inlets (3, 4) are provided for fluid at suction sides of first and second positive displacement rotary pumps (1, 2) and likewise outlets (5, 6) are provided for fluid on discharge sides, wherein viscous fluid pumped from a reservoir enters the inlet (3) of the first pump (1) and is discharged from the outlet (5), wherein an intermediate part or connection (7) is provided with an inlet (8), a first outlet (9) and a flow path (10) for fluid, wherein the outlet (5) of the first pump is connected to the inlet (8) of the intermediate part and the outlet (9) of the intermediate part is connected to the inlet (4) of the second pump, such that during the pumping the viscous fluid is forced through the first pump (1), through the intermediate part (7) and through the second pump (2) to the outlet (6) of the second pump.

17 Claims, 6 Drawing Sheets

(51) Int. Cl.
*F04C 13/00* (2006.01)
*F04C 14/26* (2006.01)
*F04C 23/00* (2006.01)

(58) Field of Classification Search
CPC ...... F04C 11/001; F04C 13/002; F04C 14/26; F04C 23/001; F04C 23/008
See application file for complete search history.

(56) References Cited

U.S. PATENT DOCUMENTS

| | | | |
|---|---|---|---|
| 4,200,207 A | 4/1980 | Akers et al. | |
| 5,190,450 A * | 3/1993 | Ghosh | F04C 2/088 384/114 |
| 5,378,128 A | 1/1995 | Yanagisawa | |
| 6,210,139 B1 * | 4/2001 | Ramanathan | F04C 2/086 418/206.4 |
| 2002/0004016 A1 * | 1/2002 | Suzuki | F04C 23/001 418/9 |
| 2005/0089424 A1 * | 4/2005 | Liu | F04C 23/001 418/9 |
| 2005/0118035 A1 * | 6/2005 | Naito | F04C 23/001 418/9 |
| 2016/0123323 A1 * | 5/2016 | Naiki | F01C 21/108 418/9 |

FOREIGN PATENT DOCUMENTS

| | | |
|---|---|---|
| JP | H05 231369 A | 9/1993 |
| JP | 2014 169672 A | 9/2014 |

OTHER PUBLICATIONS

JP2002364569A—Aikawa et al.—Multi-Stage Roots Vacuum Pump—Dec. 18, 2002—English Machine Translation. (Year: 2002).*
International Search Report (ISR), application PCT/EP2020/083632, mailed Feb. 4, 2021, 2 pages.
Written Opinion of the International Searching Authority (EP), application PCT/EP2020/083632, mailed Feb. 4, 2021, 5 pages.

* cited by examiner

DOUBLE PUMP

BACKGROUND ART

The present invention relates to an apparatus able to pump grease or similar viscous fluids. The apparatus comprises a positive displacement pump unit comprising two serially connected pumps and a central or intermediate part forming a fluid connection between the two serially connected pumps, the serially connected pumps may be positive displacement rotary pumps such as gear pumps.

The apparatus may be used in a grease or lubrication pump when pumping grease into a centralized lubrication system.

When pumping viscous fluids such as grease or fat with a positive displacement pump, the viscous fluid may not by itself flow to the suction inlet and fill the suction inlet of the pump which may cause air to be mixed into the viscous fluid on the suction side of the pump.

Positive displacement rotary pumps are pumps that move fluid using the principles of rotation. The vacuum created by the rotation of the pump captures and draws in liquid. Rotary pumps are normally efficient as they naturally remove air from the lines, eliminating the need to bleed the air from the lines manually. However, when pumping viscous fluid, there is a risk that air is sucked into the pumping chamber. Air being sucked into the pumping chamber is undesirable as this may cause the pump to stall, i.e. reduce or stop the flow of fluid through the pump.

One way to solve this problem is to pour hydraulic oil into the grease reservoir as the filling with oil will re-establish the suction functionality of the pump.

The apparatus according to the invention may be used in grease or lubrication pumps when filling centralized lubrication systems for wind turbines.

The object of the present invention is to provide a pump unit which does not stall or reduce the amount of pumped fluid, but instead works effectively and constantly. This is due to that air bubbles introduced into the pumping chamber of one pump will be removed by the other pump.

SUMMARY OF INVENTION

The present invention relates to an apparatus able to pump grease or similar viscous fluids. The objective of the present invention is to provide an apparatus being insensitive to air bubbles in the pumping system.

According to one aspect of the invention, the invention relates to an apparatus comprising two positive displacement rotary pumps, a first pump and a second pump, each pump comprises an inlet for fluid at the suction side and an outlet for fluid on the discharge side, the inlet of the first pump is connected to a reservoir of fluid by a connection such as a pipe or hose, wherein the apparatus further comprises an intermediate part comprising an inlet, a first outlet and a flow path for fluid extending between the inlet and the first outlet,
  the outlet of the first pump being connected to the inlet of the intermediate part and the first outlet of the intermediate part being connected to the inlet of the second pump, thereby forcing fluid from the reservoir of fluid through the first pump, through the intermediate part and through the second pump to the outlet of the second pump during operation.

According to any embodiment of the invention, the intermediate part may comprise or be constituted of a plate of a block of material where the flow path is constituted of an opening such as a drilled opening or the intermediate part is constituted of a pipe made of a rigid material such as metal.

According to any embodiment of the invention, the intermediate part may comprise a pipe or conduit which pipe or conduit at the inlet is connected and/or fixed to the outlet of the first pump and at the first outlet is connected and/or fixed to the inlet of the second pump. Optionally, the pipe or conduit is fixed and connected to the outlet of the first pump and the inlet of the second pump by adapters or similar means for fastening the pipe or conduit.

According to any embodiment of the invention, the intermediate part may be positioned between the pumps i.e. in close contact with surfaces of the first pump and the second pump facing each other, or the intermediate part may be positioned in close contact with surfaces of respectively the first and the second pumps positioned opposite a surface comprising the inlet of the first pump, i.e. contact surfaces faces away from the surface comprising the inlet of the first pump.

According to any embodiment of the invention, the intermediate part may comprise a pressure relief valve and a second outlet for relieving viscous fluid through the pressure relief valve.

According to any embodiment of the invention, the first and the second pump may be gear pumps, e.g. external gear pumps.

According to any embodiment of the invention, the apparatus may deliver above 1.0 l/min., e.g. above 1.5 l/min, and e.g. the apparatus may deliver less than 4.0 l/min or even less than 2.5 l/min.

According to any embodiment of the invention, the inlet of the first pump may face upwards during operation.

According to any embodiment of the invention, the outlet of the first pump may face sideways during operation, and the inlet of the second pump may face sideways during operation.

According to any embodiment of the invention, the first pump may provide at least the same volume as the second pump i.e. the first pump has at least the same capacity as the second pump, or the first pump may provide a volume larger than the second pump, i.e. the first pump has a larger capacity than the second pump, e.g. up to 10%, or e.g. up to 5% larger than the second pump.

According to a second aspect of the invention, the invention relates to a grease pump unit used for pumping viscous fluids.

According to any embodiment of the second aspect of the invention, the grease pump unit may comprise a motor configured to drive the first and the second pump, e.g. the grease pump may comprise a single motor driving the two pumps by a common drive shaft.

According to any embodiment of the second aspect of the invention, the grease pump unit may further comprise a power supply and/or a controller controlling the amount of fluid through the pumps and optionally a flow transmitter may be positioned after the second pump.

According to any embodiment of the second aspect of the invention, the grease pump unit may be a portable unit where all the functional parts are contained into or fitting into a box comprising a handle.

According to any embodiment of the second aspect of the invention, the grease pump may be used for filling lubrication systems for wind turbines or the like.

BRIEF DESCRIPTION OF THE DRAWINGS

Throughout the application identical or similar elements of different embodiments are given the same reference numbers.

Definitions of Words

In general—when this expression is used in respect of a feature, the feature may be employed with any embodiment of the invention, even though the specific mentioning appears in the detailed part of the description.

A viscous fluid—Viscosity of a fluid determines to what degree fluids resists their shear deformation, and a viscous fluids provide resistance between the layers of the fluid which will prevent the viscous fluid from flowing fast towards an outlet thereby increasing the risk of mixing air into the fluid at the outlet during pumping.

Positive displacement rotary pumps—are pumps using the actions of rotating cogs or gears to transfer fluids, rather than the backwards and forwards motion of reciprocating positive displacement pumps. The rotating element develops a liquid seal with the pump casing and creates suction at the pump inlet. Fluid, drawn into the pump, is enclosed within the teeth of its rotating cogs or gears and transferred to the discharge pump outlet. The simplest example of a positive displacement rotary pump is the gear pump. There are two basic designs of gear pump: external and internal. An external gear pump consists of two interlocking gears supported by separate shafts (one or both of these shafts may be driven). Rotation of the gears traps the fluid between the teeth moving it from the inlet, to the discharge, around the casing. No fluid is transferred back through the center between the gears because they are interlocked. An internal gear pump operates by same principle, but the two interlocking gears are of different sizes with one rotating inside the other. The cavities between the two gears are filled with fluid at the inlet and transported around to the discharge port, where it is expelled by the action of the smaller gear. Gear pumps are lubricated by the pumped fluid and are ideal for pumping oils and other high viscosity liquids. Two other designs similar to the gear pump are the lobe pump and vane pump. A further class of rotary pumps uses one or several, meshed screws to transfer fluid along the screw axis. Positive Displacement pumps are often used for pumping fluids with a certain viscosity such as oil, paints, resins or foodstuffs.

DETAILED DESCRIPTION OF INVENTION

In general, the invention relates to an apparatus for pumping viscous fluids comprising two serially connected positive displacement pumps. That the pumps are serially connected means that at least a part of the fluid flowing out of a first pump enters into the pumping chamber of a second pump.

The effect of having serially connected positive displacement pumps is that, if air is drawn into the first pump preventing the first pump from transporting viscous fluid through the pump, then the second pump will suck the viscous fluid and air out of the first pump, and if air is drawn into the second pump, then the first pump will force viscous fluid into the second pump and force the air out of the second pump.

Figure 1A:
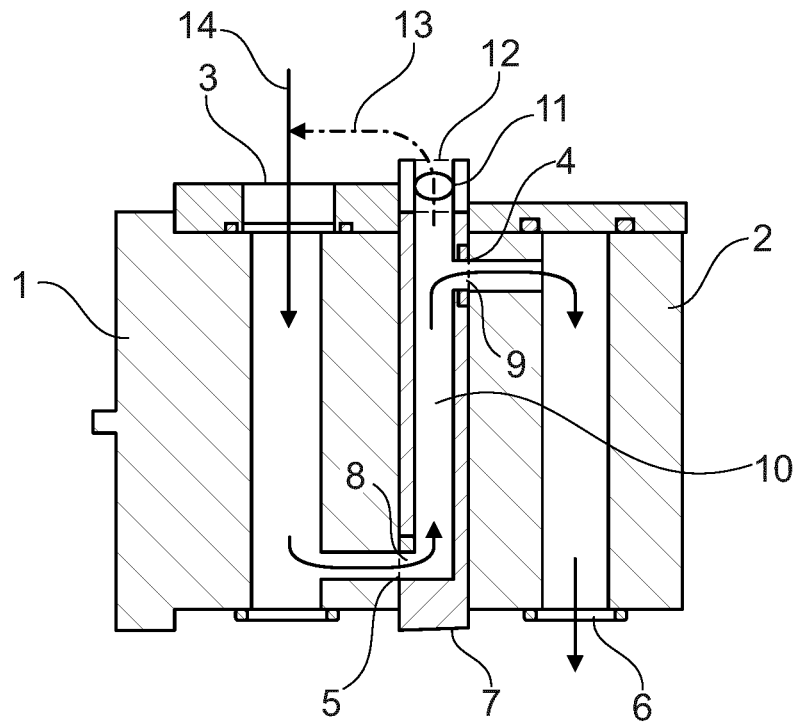
FIG. 1A and FIG. 1B disclose respectively a cut-through side view of an embodiment of an apparatus according to the invention, and a top view of the same embodiment.
Figure 1B:
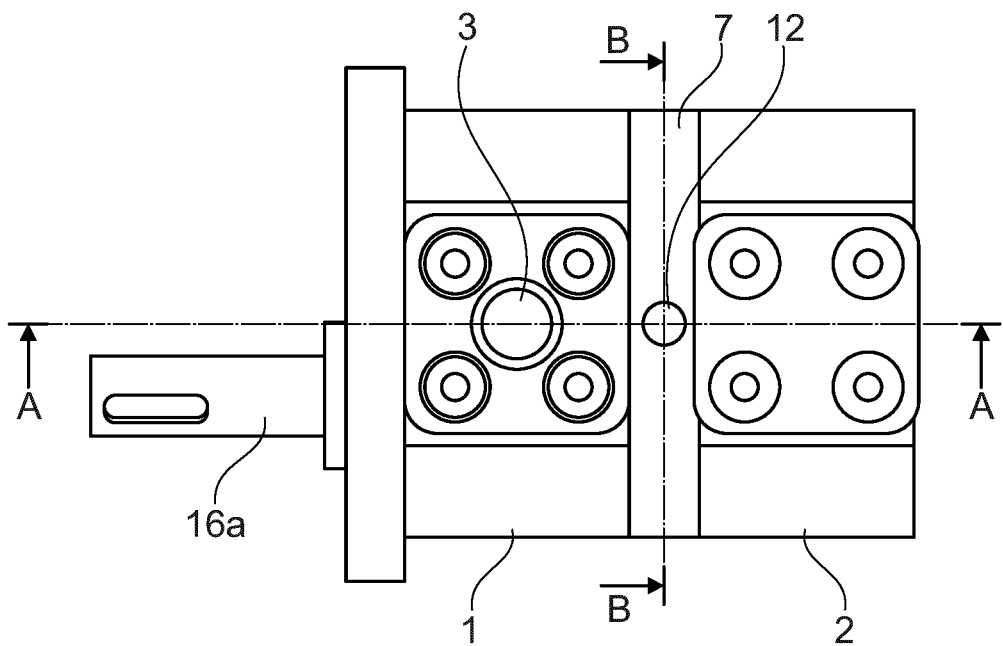
Figure 2:
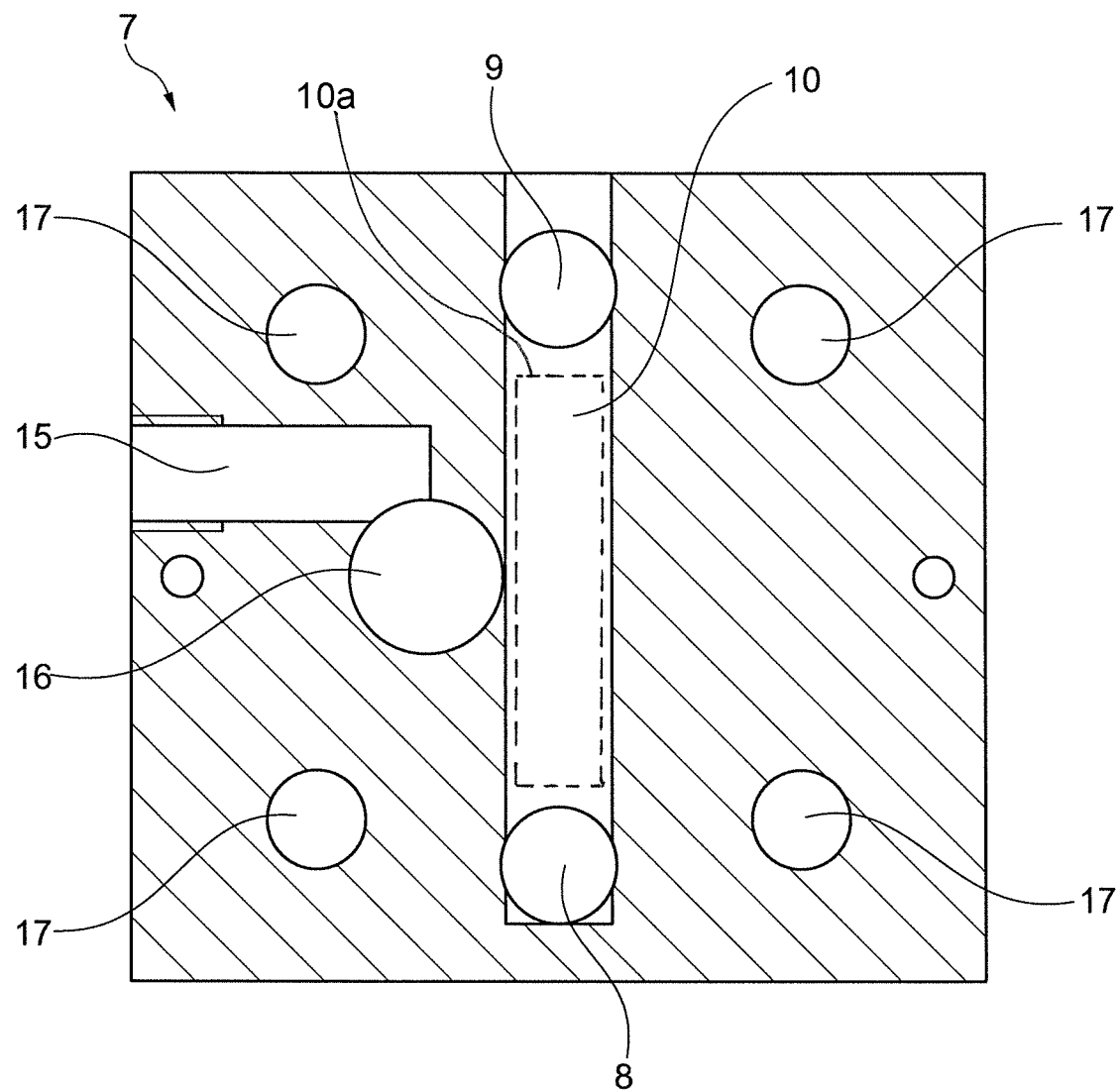
FIG. 2 discloses a cut-through side view of an embodiment of an intermediate part according to the invention.

FIGS. 1-3 illustrates a first embodiment of a double pump where an intermediate part or connection is positioned between the two pumps i.e. in close contact with surfaces respectively of the first pump and the second pump facing each other.

FIG. 1A and FIG. 1B illustrate an embodiment comprising a first pump 1 and a second pump 2. FIG. 1A disclose a cut-through view along the line A-A of FIG. 1B, FIG. 1B. The pumps will normally of the same type e.g. the pumps will normally be two positive displacement rotary pumps such as external or internal gear pumps, but the pumps 1 and 2 may also be different.

The arrows illustrate the flow of liquid through the apparatus from an inlet 3 in the first pump, through an inlet into an intermediate part 7, through the intermediate part 7 through an inlet 4 of a second pump and therefrom to the outlet 6 of the apparatus and the second pump. The presence of an intermediate part 7 between two pumps, which intermediate part 7 defines and comprises an internal flow path 10 makes it possible to use two standard pumps 1,2 positioned side-by-side.

In general, the first and the second pumps are approximately the same size i.e. the two pumps have approximately the same pumping capacity, i.e. the two pumps are able to displace approximately the same amount of fluid. E.g. the first pump is slightly larger than the second pump, e.g. the first pump has a pumping capacity being between 1-10% larger, e.g. 1-6% larger, than the pumping capacity of pump 2.

Each pump 1, 2 comprises an inlet 3, 4 for fluid at the suction side and an outlet 5, 6 for fluid on the discharge side, the inlet 3 of the first pump 1 is connected to a not shown reservoir of fluid by a pipe or other connection.

The apparatus further comprises a connecting part in the form of an intermediate part 7 positioned between the first and the second pump, the intermediate part 7 comprises an inlet 8 and a first outlet 9, a flow path 10 for fluid and optionally a pressure relief valve 11 and a second outlet 12 for fluid through the pressure relief valve 11. The intermediate part 7 is normally constituted of a non-flexible material such as metal, e.g. steel or aluminum.

The presence of the intermediate part 7 makes it possible to connect the outlet 5 of the first pump 1 to the inlet of the second pump 2 providing an intermediate volume of fluid. The volume of fluid $v_c$ held in the intermediate part 7 during operation will normally be at least 10% of the volume of fluid $v_{p1}$ held in the first pump and/or 10% of the volume $v_{p2}$ held in the second pump.

In a preferred embodiment, the intermediate part 7 is shaped as a rectangular block or plate of material provided with openings. If the intermediate part 7 comprises or is constituted of a plate of block of material, the flow path 10 may be constituted of a through-going opening e.g. an opening drilled from the side, alternatively the intermediate part 7 may be constituted of a pipe or similar e.g. made of a rigid material such as metal.

In a preferred embodiment, the inlet of the first pump 1 is facing upwards during operation to support in-flow of fluid to the pumping chamber of the first pump 1.

In order to reduce height of the complete apparatus, the first and the second pumps 1, 2 are positioned side-by-side with the intermediate part 7 positioned in-between the two pumps. In this embodiment, the pumping chambers of both the first and the second pump may be positioned to have a vertical flow through the pumping chamber, i.e. gravity will support the flow through the pumping chamber.

According to the embodiment of FIG. 1, the inlet 4 of the second pump 2 is facing sideways during operation in tight connection with a sideways outlet 9 from the intermediate part 7. A connection from the inlet 4 may lead a flow of fluid to the pumping chamber which pumping chamber may be positioned to have a vertical flow, i.e. fluid enters the pumping chamber at the top and leaves the pumping chamber at the bottom.

When the apparatus is assembled and ready for operation, the outlet 5 of the first pump 1 is connected to the inlet 8 of the intermediate part 7, and the first outlet 9 of the intermediate part 7 is connected to the inlet 4 of the second pump 2. During operation fluid is forced from the not shown reservoir of fluid through the first pump 1, through flow path 10 of the intermediate part 7 and through the second pump 2 to the outlet 6 of the second pump. If the pressure inside the flow path 10 increases above a certain level, the pressure relief valve 11 will open and release fluid through the second outlet 12 into a pipe 13 or similar connection. Fluid let out through the second outlet 12 may be returned to the not shown fluid reservoir or be returned to a pipe 14 or to another device connecting the reservoir to the first pump 1, or it may enter directly into the first pump 1 through a second not shown inlet.

FIG. 2 shows a cut-through view of an embodiment of an intermediate part 7.

This embodiment of an intermediate part is constituted of or comprises a rectangular block of material which may be described as a plate, where the cross-section in the dimension shown in FIG. 2, i.e. the area of the plate, is considerably larger i.e. at least 5 times larger than the dimension perpendicular to the dimension shown in FIG. 2, i.e. the thickness of the plate.

The intermediate part 7 may comprise a plurality of through-going openings. The flow path 10 is provided by an opening e.g. drilled from a side surface. At one end, the flow path opening may be connected to a through-going opening transverse to the flow path opening which through-going opening comprises or constitutes the outlet 9 to the second pump 2, and at the opposite end of the flow path opening a transverse opening may comprise or constitute the inlet 8 to the intermediate part 7 corresponding to the outlet 5 from the first pump.

An opening 15 for receiving viscous fluid e.g. returned from a second outlet of intermediate part 7 may be provided through a side surface of the intermediate part 7.

A through-going opening 16 may allow a drive shaft common for the two pumps to reach through the intermediate part 7.

A plurality of through-going openings 17 may allow for fastening parts such as bolt or screws to be inserted through e.g. one pump and the intermediate part 7 or e.g. through both pumps and the intermediate part 7.

Figure 3C:
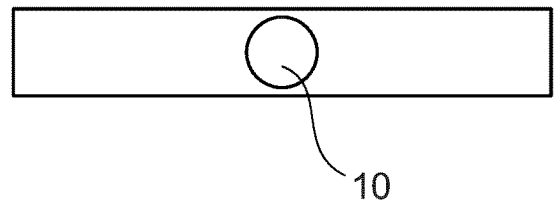
FIG. 3A, FIG. 3B and FIG. 3C disclose respectively a front view, a top view and a side view of an embodiment of the intermediate part or connection of FIG. 2.
Figure 3B:
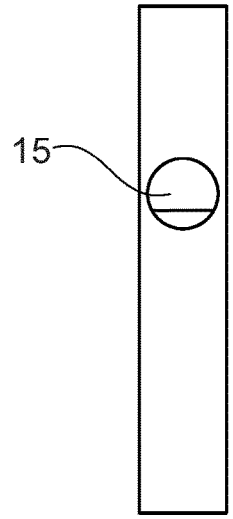
Figure 3A:
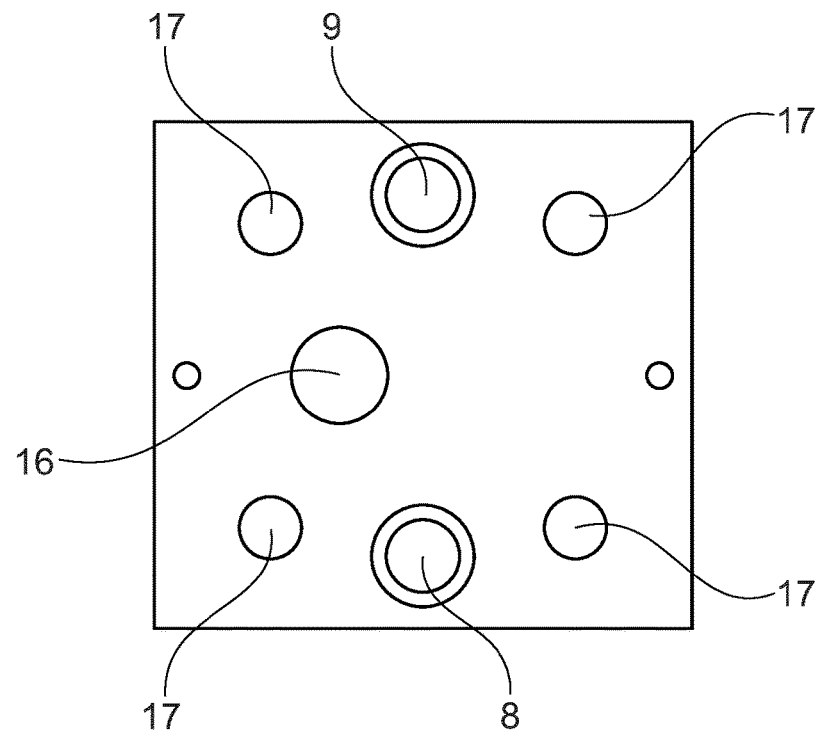

FIGS. 3A-3C illustrate the same embodiment of the intermediate part or connection 7 as FIG. 2, where FIG. 3A shows a front view, FIG. 3B shows a side view and FIG. 3C shows a top view of the intermediate part or connection. It is only possible to see the top end of the flow path 10 as the opening constituting the flow path has been drilled into the block of material from the top side.

Figure 4A:
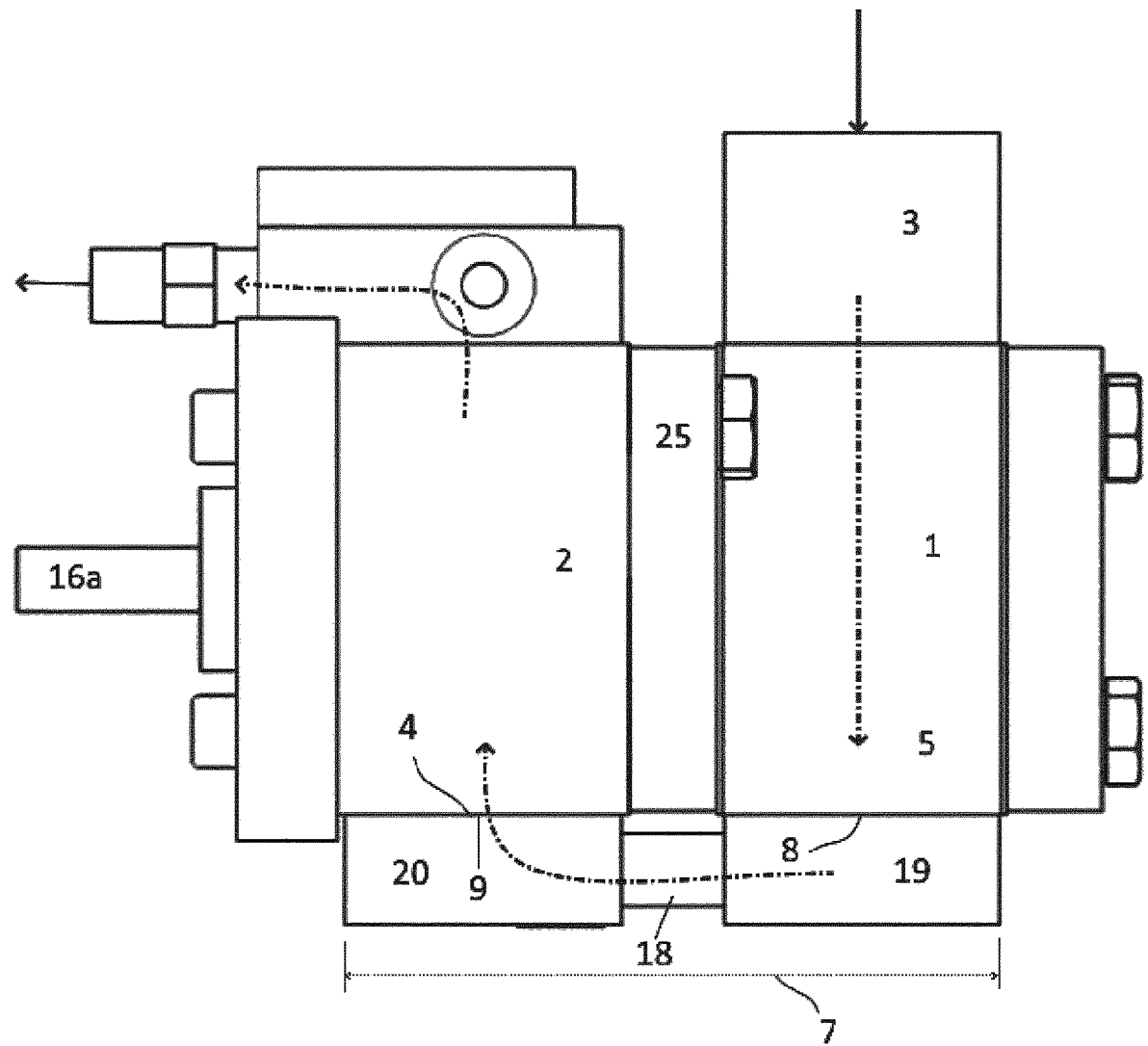
FIG. 4A discloses a side view of a second embodiment of an apparatus according to the invention.
Figure 4B:
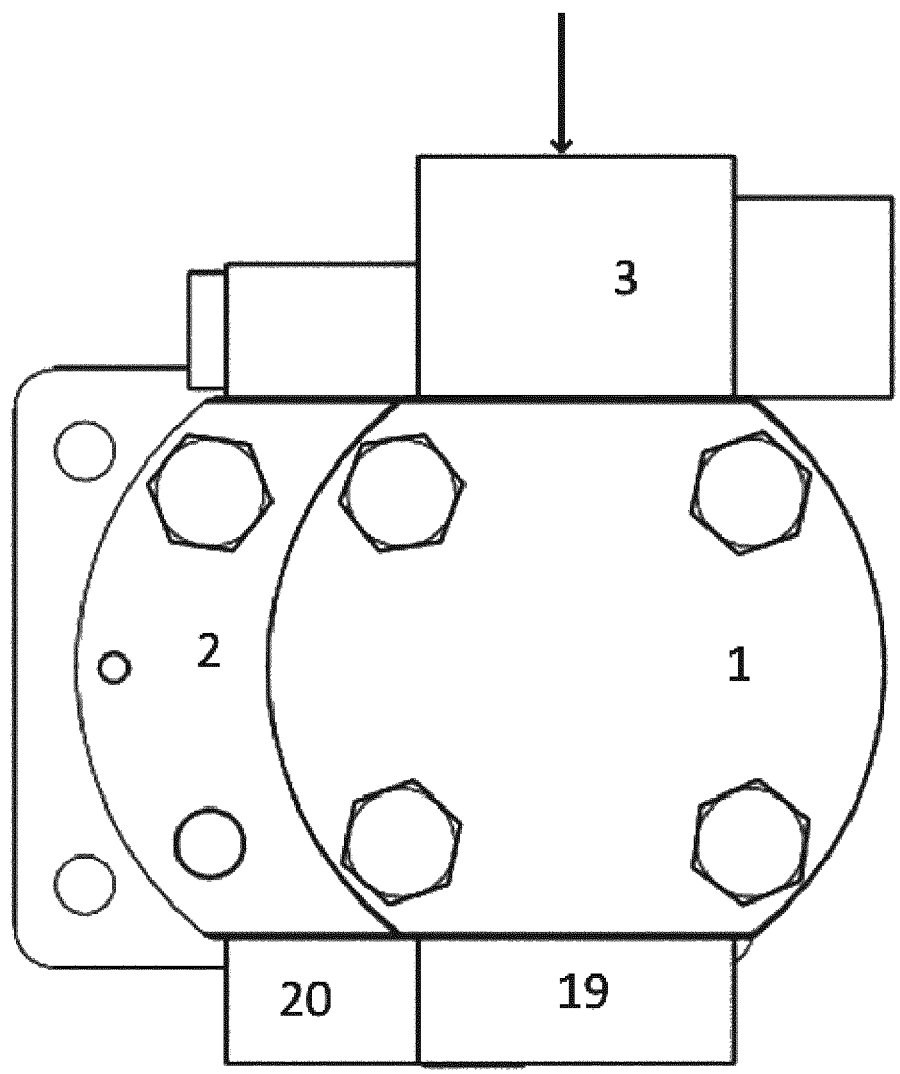
FIG. 4B discloses an end view of the same embodiment as disclosed in FIG. 4A.

FIG. 4A and FIG. 4B show a second embodiment of a double pump comprising an intermediate part or connection where the intermediate part or connection is positioned in close contact with surfaces of respectively the first and the second pumps positioned opposite a surface comprising the inlet of the first pump, i.e. the contact surfaces face away from the surface comprising the inlet of the first pump.

FIG. 4A discloses a side view of the second embodiment of the grease pump unit. The apparatus comprises a first pump 1 and a second pump 2 and an intermediate part or connection 7. The intermediate part 7 of this embodiment is not positioned exclusively between the first and the second pump 1, 2, but is constituted of external parts comprising a conduit or pipe part 18, a first adapter part 19 constituting a connection or attachment between inlet of the conduit 18 and an outlet of the first pump 1 and a second adapter part 20 constituting a connection or attachment between the outlet of the conduit 18 and an inlet of the second pump 2. The apparatus may comprise a second intermediate part 25 positioned in a space between the first and the second pump, however, this second intermediate part 25 does not allow fluid to flow through, but is positioned between the first and the second pump 1, 2 in order to provide a support for fixing the pumps 1, 2 relative to each other.

Arrows indicate the flow of viscous fluid through the first and second pump 1, 2. The inlet 3 of the first pump 1 is configured for being attached or connected to a container holding viscous fluid. The container is not shown in the figure as the container is only attached during operation of the apparatus.

Figure 5:
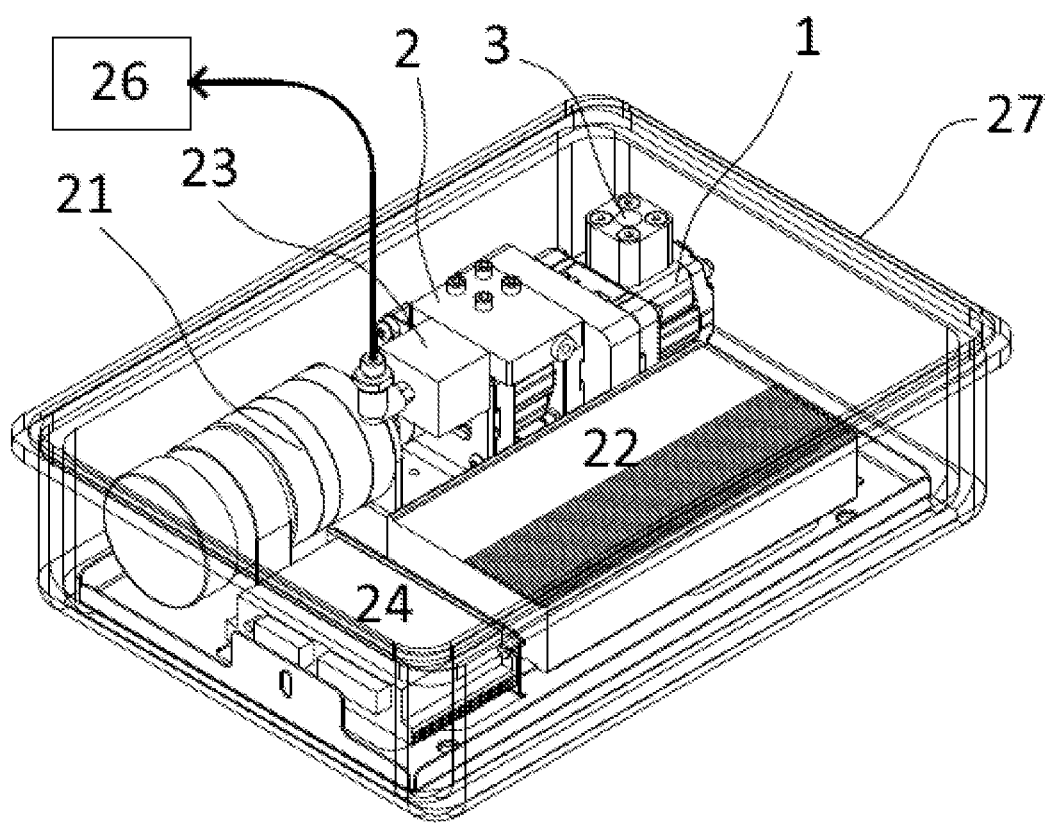
FIG. 5 illustrates a grease pump unit according to the invention.

FIG. 5 illustrates a grease pump unit according to the invention. The grease pump unit according to the invention further comprises at least one motor 21 driving a drive shaft 16a which drive shaft 16a may be common for both the first and the second pump 1, 2, and may further comprise a power supply 22, a controller 24 and optionally a flow transmitter 23. The power supply may supply 12 V, 24 V or 48 V.

The functional parts of the grease pump unit—including the parts mentioned above—may be positioned in a portable box 27 e.g. comprising a handle for carrying the box.

During operation i.e. when the apparatus is to be used to pump viscous fluid from a container to a lubrication system 26, the box is opened, a container for viscous fluid such as grease is fluidly connected and fastened to the inlet 3 of the first pump 1, and grease may then be pumped into the lubricating system 26 by activating the motor 21.

FIG. 4B discloses an end view of the grease pump unit of FIG. 4A seen from the end of the first pump 1. FIG. 4B discloses that the first and second pump may be horizontally displaced relative to each other in order to make a single common drive shaft 16a drive both pumps.

| Ref. no. | Ref. name |
| --- | --- |
| 1 | First pump |
| 2 | Second pump |
| 3 | Inlet for first pump |
| 4 | Inlet for second pump |
| 5 | Outlet for fist pump |
| 6 | Outlet for second pump |
| 7 | A connecting part formed as an intermediate part or connection |
| 8 | Inlet for intermediate part |
| 9 | First outlet for intermediate part |

| Ref. no. | Ref. name |
|---|---|
| 10 | Flow path through intermediate part |
| 11 | Pressure relief valve |
| 12 | Second outlet from intermediate part |
| 13 | Pipe or other connection receiving fluid from second outlet from intermediate part |
| 14 | Pipe or other connection configured to transport fluid to the inlet of the first pump |
| 15 | Opening for returned fluid from pressure relieve valve |
| 16 | Opening for common drive shaft for pumps |
| 16a | Common drive shaft for pumps |
| 17 | Opening for fastening parts |
| 18 | Pipe or conduit being part of an intermediate part |
| 19 | First adapter part |
| 20 | Second adaptor part |
| 21 | Motor |
| 22 | Power supply |
| 23 | Flow transmitter |
| 24 | Controller |
| 25 | Second intermediate part |
| 26 | Lubrication system |
| 27 | Box for portable unit |

The invention claimed is:

1. A grease pump comprising two positive displacement rotary pumps, a first pump (1) and a second pump (2), wherein each pump comprises an inlet (3, 4) for grease at a suction side and an outlet (5, 6) for grease on a discharge side, wherein the inlet (3) of the first pump (1) is connectable to a reservoir of the grease by a connection (14) pipe or hose and the outlet (6) on the discharge side of the second pump is connectable to a lubrication system (26), wherein the inlet (3) of the first pump (1) faces upwards during the pumping of the grease, wherein the grease pump further comprises an intermediate part or connection (7) comprising an inlet (8), a first outlet (9) and a flow path (10) for the grease, wherein the outlet (5) on the discharge side of the first pump is connected to the inlet (8) of the intermediate part and the first outlet (9) of the intermediate part is connected to the inlet (4) on the suction side of the second pump, such that during the pumping the grease is forced from the reservoir through the first pump (1), through the intermediate part (7) and through the second pump (2) to the outlet (6) on the discharge side of the second pump.

2. The pump according to claim 1, wherein the intermediate part (7) comprises a plate of a block of material where the flow path (10) includes a drilled opening or the intermediate part (7) comprises a pipe made of a rigid material.

3. The pump according to claim 1, wherein the intermediate part (7) comprises a pipe or conduit (18) which at the inlet (8) of the intermediate part is connected to the outlet (5) of the first pump (1) and at the first outlet (9) of the intermediate part is connected to the inlet (4) of the second pump (2).

4. The pump according to claim 1, wherein the intermediate part (7) comprises a pressure relief valve (11) and a second outlet (12) for relieving viscous fluid through the pressure relief valve.

5. The pump according to claim 1, wherein the first pump and the second pump are gear pumps.

6. The pump according to claim 1, wherein the pump delivers above 1.0 l/min or above 1.5 l/min, and the pump delivers less than 4.0 l/min or less than 2.5 l/min.

7. The pump according to claim 1, wherein the outlet (5) of the first pump (1) faces sideways during the pumping of the viscous fluid, and the inlet (4) of the second pump (2) faces sideways during the pumping of the viscous fluid.

8. The pump according to claim 1, wherein the first pump (1) provides at least the same volume as the second pump (2) or the first pump (1) provides a volume larger than the second pump by up to 10% larger than the second pump or up to 5% larger than the second pump.

9. The pump according to claim 1, wherein the first pump (1) provides at least the same volume as the second pump (2).

10. The pump according to claim 1, wherein the first pump (1) provides a volume larger than the second pump by up to 10% larger than the second pump or up to 5% larger than the second pump.

11. The pump according to claim 1, wherein during operation any air drawn into the first pump along with grease from the reservoir is sucked out of the first pump by the second pump and said air sucked out of the first pump by the second pump is forced out of the second pump by the first pump.

12. The grease pump according to claim 1, comprising at least one motor configured to drive the first pump and the second pump.

13. The pump according to claim 12, wherein said at least one motor comprises a single motor driving the first pump and the second pump by a common drive shaft (16a).

14. The grease pump according to claim 1, further comprising a power supply and a controller for controlling an amount of grease pumped.

15. The grease pump according to claim 14, further comprising a flow transmitter is positioned downstream of the second pump (2).

16. The grease pump according to claim 1, wherein the grease pump unit is a portable unit wherein functional parts are contained into or fitted into a box comprising a handle.

17. The grease pump according to claim 1, wherein the grease pump is usable for filling a lubrication system for a wind turbine.

* * * * *